(12) United States Patent  
Johansson et al.

(10) Patent No.: US 7,896,310 B2  
(45) Date of Patent: Mar. 1, 2011

(54) PINCH VALVE

(75) Inventors: Bjorn A. Johansson, Uppsala (SE); Roger Lundqvist, Alunda (SE); Dan Hermansson, Uppsala (SE)

(73) Assignee: GE Healthcare Bio-Sciences AB, Uppsala (SE)

( * ) Notice: Subject to any disclaimer, the term of this patent is extended or adjusted under 35 U.S.C. 154(b) by 361 days.

(21) Appl. No.: 11/953,164

(22) Filed: Dec. 10, 2007

(65) Prior Publication Data

US 2008/0135115 A1   Jun. 12, 2008

Related U.S. Application Data

(60) Provisional application No. 60/869,351, filed on Dec. 11, 2006.

(30) Foreign Application Priority Data

Dec. 11, 2006   (SE) ...................................... 0602658

(51) Int. Cl.
*F16K 7/04* (2006.01)
(52) U.S. Cl. .................... 251/7; 251/4; 251/95; 251/114
(58) Field of Classification Search .................. 251/4, 7, 251/8, 89, 95, 98, 111, 114
See application file for complete search history.

(56) References Cited

U.S. PATENT DOCUMENTS

| | | | | | |
|---|---|---|---|---|---|
| 3,011,750 | A | * | 12/1961 | Johnson et al. | 251/5 |
| 3,410,517 | A | * | 11/1968 | Wall | 251/6 |
| 3,982,724 | A | * | 9/1976 | Citrin | 251/7 |
| 4,230,151 | A | * | 10/1980 | Jonsson | 137/595 |
| 4,436,277 | A | * | 3/1984 | Robak et al. | 251/6 |
| 5,098,060 | A | * | 3/1992 | Mogler et al. | 251/7 |
| 5,219,327 | A | * | 6/1993 | Okada | 604/34 |
| 6,082,702 | A | * | 7/2000 | Campau | 251/8 |
| 6,340,096 | B1 | * | 1/2002 | Zerfas | 222/1 |
| 6,394,411 | B1 | * | 5/2002 | Hafner et al. | 251/7 |

* cited by examiner

*Primary Examiner* — John K Fristoe, Jr.
(74) *Attorney, Agent, or Firm* — Yonggang Ji

(57) ABSTRACT

A pinch valve is adapted to hold at least one flexible tube in a tube holding room (7) and comprises a plunger (13) adapted to protrude into the tube holding room and pinch the tube against an opposite side wall (11) thereof. The plunger (13) is controllable to be positioned in at least two different positions, an open position where the tube in the tube holding room (7) is not pinched, and a pinching position where the tube is pinched between the plunger (13) and the opposing wall (11). The pinch valve further comprises a tube retaining means (19) adapted to prevent the tube from escaping from the tube holding room (7), especially when the plunger (13) is in the open position, and which can be pivoted into at least two different positions, a non locking position used during insertion of a tube into the tube holding room (7), and a locking position for retaining a tube inside the tube holding room (7) even when the plunger is in an open position.

11 Claims, 3 Drawing Sheets

PINCH VALVE

CROSS REFERENCE TO RELATED APPLICATIONS

This application claims priority to U.S. provisional patent application No. 60/869,351 filed Dec. 11, 2006 and Swedish priority patent application number 0602658-7 filed Dec. 11, 2006; the entire disclosures of which are incorporated herein by reference in their entireties.

TECHNICAL FIELD OF THE INVENTION

The present invention relates to a pinch valve according to the preamble of claim 1.

BACKGROUND OF THE INVENTION

Pinch valves are used in for example different kinds of systems where fluids are transported, for example in chemical industries, medicine industries and food industries. They are normally used together with flexible tubes such that a tube can be provided in a pinch valve and be in a non pinched position where for example fluid can flow through the tube and in a pinched position where the tube is compressed such that no fluid can flow through the tube.

In the non pinched position, hereafter also called the open position, there can be a problem that tubes escape out from the pinch valve, especially when comparably small tubes are used. One kind of pinch valve has been proposed where a tube holding room is provided in the form of a L or J, i.e. with a bend, into which the tube should be fitted. One such model is the "model 934 pneumatic pinch valve" from ACRO (see website for ACRO). This kind of pinch valve requires often that the tube is compressed during the insertion and furthermore the bend in the tube holding room makes it more difficult to clean. Pinch valves are often used in fluid systems where cleaning and disinfection is very important.

SUMMARY OF THE INVENTION

An object of the present invention is to provide an improved pinch valve suitable for use with tubes of different sizes.

This is achieved in a pinch valve according to claim 1. Hereby the tube retaining means provides a lock for the tube such that the tube stays in place even when the pinch valve is in a non pinching position. Furthermore tubes of different sizes can be used without the risk that especially small tubes escape from the pinch valve.

Preferable embodiments are described in the dependent claims.

In one preferred embodiment, the pinch valve includes means for protecting to an operator from accidental pinching events.

The pinch valve of the invention may advantageously be used in situations which involve frequent tubing exchange operations. This is, for example, the case for a type of bio-processing, including e.g. chromatography or filtration, using a pre-sterilized single-use tubing-based flow path which in operation is engaged with a plurality of remotely controlled re-usable pinch valves and which may include other disposable type components like different sensors.

DETAILED DESCRIPTION OF THE INVENTION

According to the invention a tube retaining means is provided to the pinch valve. The tube retaining means can be positioned in at least two different positions, where one is called a non locking position and another is called a locking position. When the tube retaining means is in its non locking position a tube can be entered into the pinch valve and when the tube retaining means is in its locking position any tube being positioned inside the pinch valve can not escape out from it. The tube retaining means can be designed as a pivoting barrier covering the top (according to the direction in the Figures) of a tube holding room of the pinch valve when it is in its locking position.

Figure 1A:
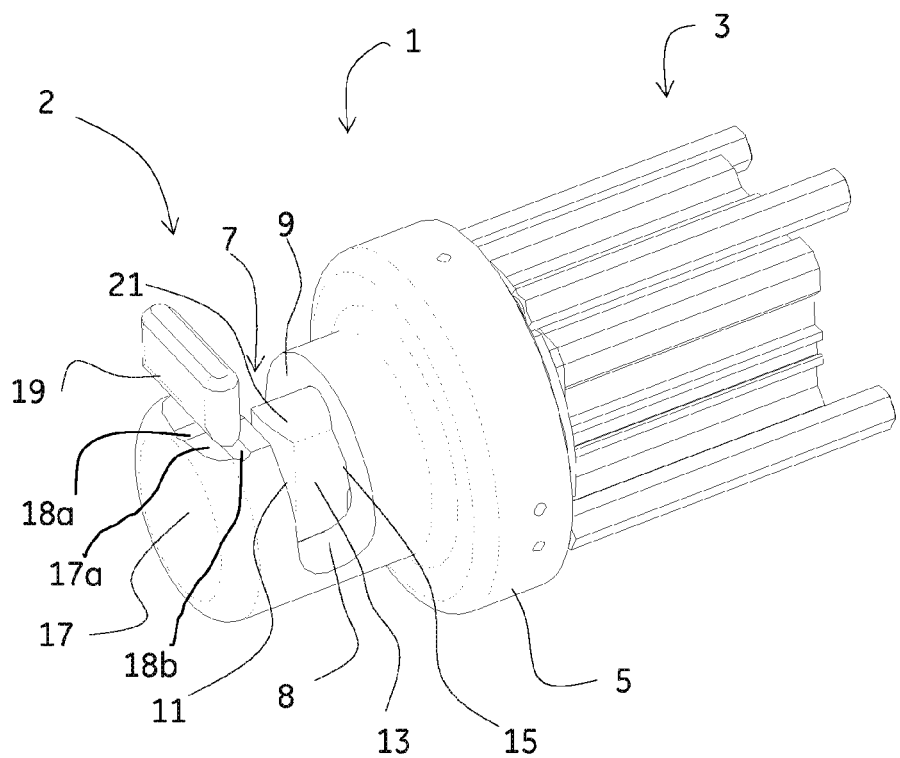
FIG. 1a shows a pinch valve according to one embodiment of the invention. A tube retaining means is shown in a non locking position.
Figure 1B:
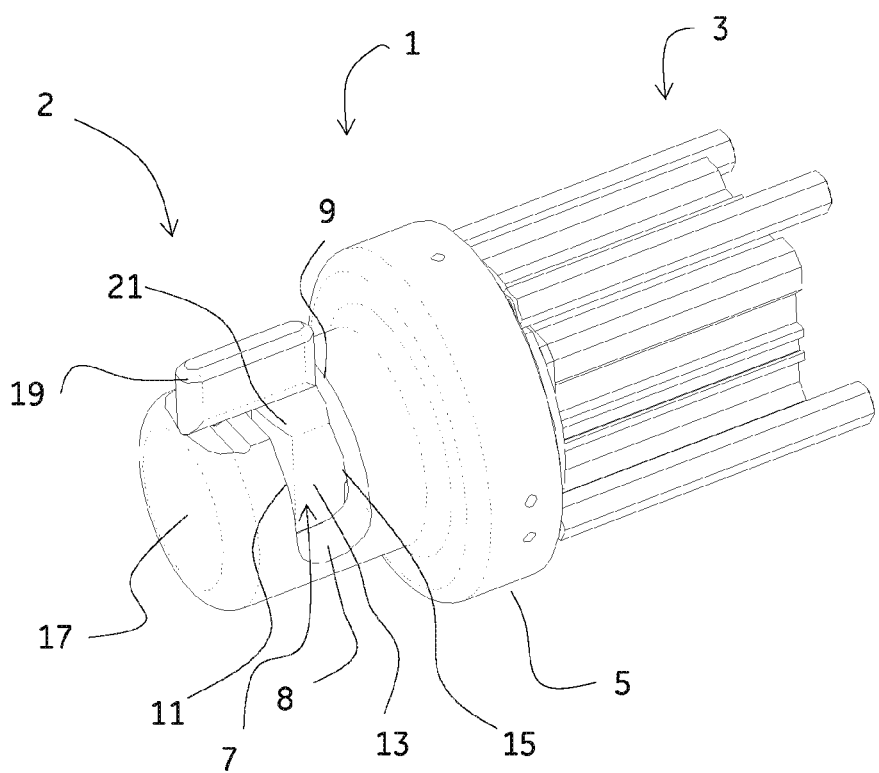
FIG. 1b shows the same pinch valve as in FIG. 1a but the tube retaining means is shown in a tube locking position.

In FIGS. 1a and 1b one preferred embodiment of the invention is shown. The different parts are the same in the two figures and the parts are therefore given the same reference numerals.

A pinch valve 1 is shown having a pinch end 2 on the left side in FIGS. 1a and b, and a supply end 3 on the right side in the Figures. The pinch valve comprises in this embodiment a cylindrical body 5. A tube holding room 7 is provided in said body 5. The tube holding room 7 is in this embodiment an almost cylindrical cut out from the cylindrical body 5 where only the bottom part 8 is left. Bottom relates here to the directions of the FIGS. 1a and b. Of course the pinch valve need not be mounted in this direction when in use. In a first wall 9 of the tube holding room 7, i.e. the wall closest to the supply end 3 of the pinch valve, a plunger 13 is shown protruding out from a hole 15 in said wall 9. Said plunger 13 is in this embodiment controlled pneumatically from the supply end 3 of the pinch valve. Other possible methods to control the plunger in pinch valves are for example solenoids, i.e. electromagnetism or an electric motor. Suitably said plunger 13 has almost the same height (referring to directions of Figures) as the tube holding room. This is in order to avoid that a small tube possibly could pass under or above said plunger 13 and not be pinched properly. The tube holding room 7 is the space between the bottom 8, the first wall 9 and a second wall 11, which is the wall of the tube holding room 7 that is closest to the pinch end 2 of the pinch valve. The cylindrical body 5 forms an end piece 17 in the outermost end of the pinch end 2 of the pinch valve after the tube holding room 7.

According to the invention a tube retaining means 19 is provided. In this embodiment the tube retaining means 19 is provided on the end piece 17 in the form of a pivoting barrier.

In FIG. 1a the tube retaining means 19 is shown in its non locking position where the tube holding room is open upwards according to the directions in the figure and a tube can be entered into the tube holding room 7. In FIG. 1b the tube retaining means 19 is shown in its locked position where the barrier 19 covers the upper part of the tube holding room 7 such that it is not possible for a tube that is positioned in the tube holding room 7 to escape out from the room.

Preferably the tube retaining means 19 can be operated from both sides of the pinch valve. Relating to the Figures this should be represented by a third position of the tube retaining means 19. The tube retaining means 19 is snapped clockwise one snap from the position shown in FIG. 1b into a third position, which is a non locking position. From the third position it can be snapped back counter clockwise into a locking position again. The tube retaining means can thus preferably be positioned in at least three different positions. This could be valuable in many systems where there is little space for manual operations. An alternative where the tube retaining means still can be operated from both sides of the pinch valve is to have a longer tube retaining means that always is operable from both sides. If there is little room a disadvantage with this solution could be that the tube retaining means will protrude out from the pinch valve in the pinch end 2 direction when the tube retaining means is in a tube locking position.

Preferably the tube retaining means 19 fits closely above an upper side 21 of the plunger 13 when the tube retaining means 19 is in its locking position. This is to prevent the tube to escape into a room otherwise provided between the tube retaining means 19 and the plunger 13. If the plunger 13 can not be provided very close to the upper circumference of the cylindrical body the end piece 17 can be faced down as shown in FIGS. 1a and b.

Hereby the tube retaining means 19 is positioned such that it smoothly fits right above the upper side 21 of the plunger 13 and no space is provided there between.

In another embodiment of the invention the body of the pinch valve need not be cylindrical. It can be of any form, for example polygonal, allowing a tube holding room to be provided in it and the plunger to pass through it and protrude out into the tube holding room.

The tube holding room should be designed such that a tube is passing through it and when the plunger is in non pinching position the tube should pass through the pinch valve unaffected.

In another embodiment of the invention the tube retaining means could be electrically and/or remotely controlled instead of the manual handling as described in connection to FIGS. 1a and 1b. This requires of course some electrical connections and controlling devices.

In still another embodiment of the invention, the pinch valve is provided with pinch protection means to prevent pinching accidents during insertion or removal of a tube.

Figure 2A:
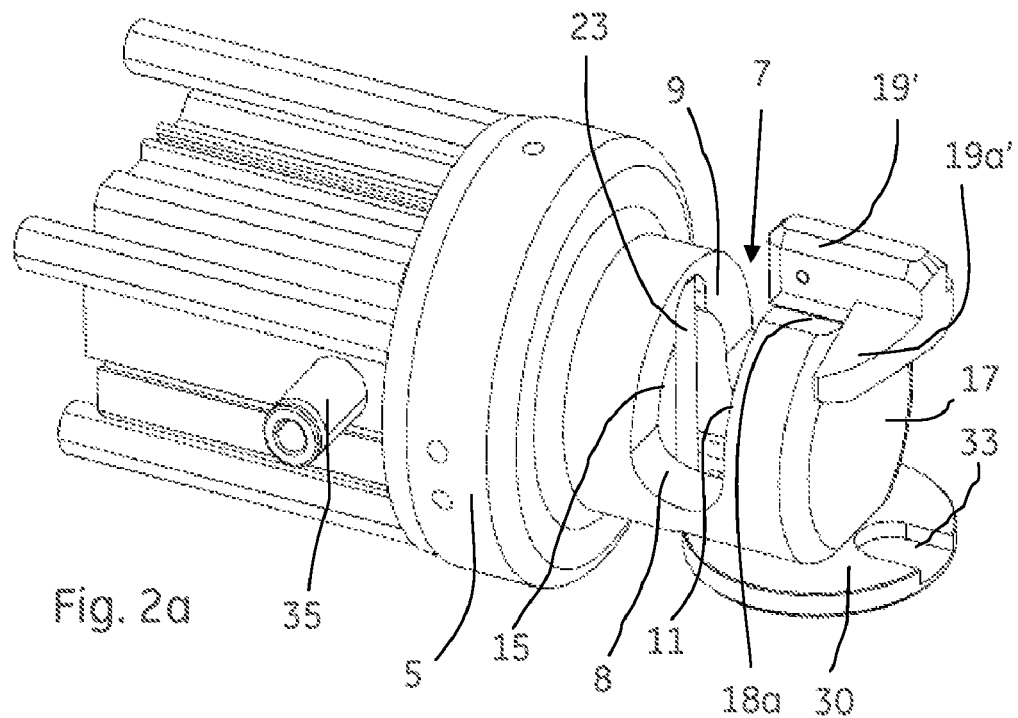
FIG. 2a shows a pinch valve according to another embodiment of the invention with the tube retaining means shown in a non-locking position.
Figure 2B:
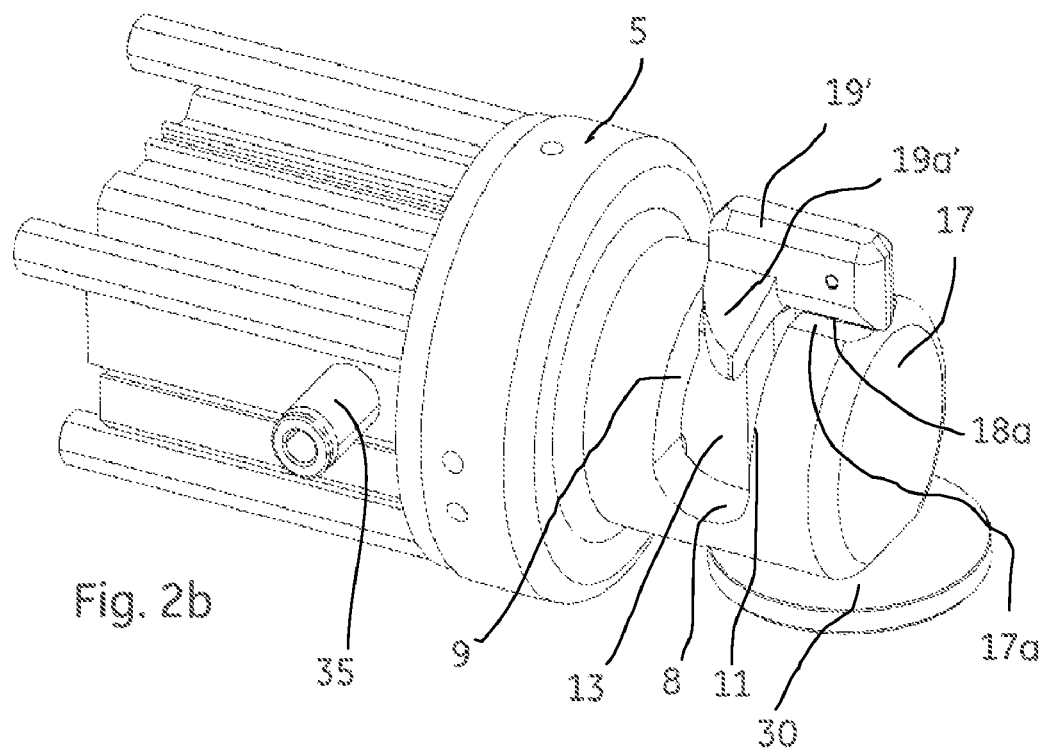
FIG. 2b shows the same pinch valve as in FIG. 2a but with the tube retaining means shown in a tube locking position.
Figure 3:
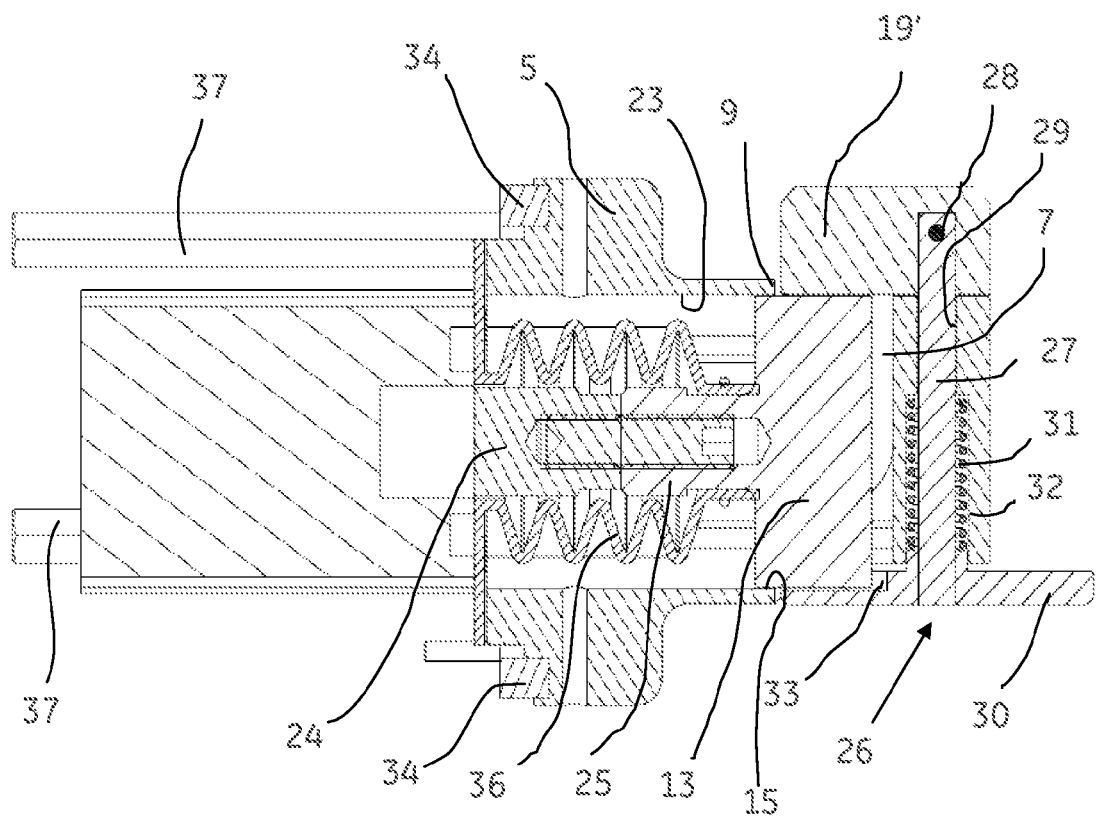
FIG. 3 is a longitudinal cross-sectional view of the pinch valve in FIG. 2b.

A pinch valve provided with an embodiment of such pinch protections means is shown in FIGS. 2a, 2b and 3. Corresponding parts to those in FIGS. 1a and 1b are given the same reference numerals.

The pinch valve embodiment shown in FIGS. 2a, 2b and 3 is basically the same as that described above and shown in FIGS. 1a, 1b, except for the provision of pinch protection means. Thus, with particular reference to FIG. 3, also this pinch valve embodiment comprises a generally cylindrical body 5 with a tube holding room 7. A plunger 13 is slidably mounted in a recess 23 in the body 5 extending to an opening 15 in a first wall 9 of the tube holding room 7, the lower part of recess 23 further extending throughout the bottom portion 8 (see FIGS. 2a, 2b) of the tube holding room 7 where the recess is open downwardly. The plunger 13 is actuated pneumatically (a compressed air supply connection is indicated at 35 in FIGS. 2a and 2b) to be in a pinching position where the plunger 13 protrudes through the opening 15 and can pinch a tube (not shown) inserted into the tube holding room 7 against a second wall 11 thereof, or to be in a non-pinching position where the plunger is completely retracted into the recess 23. In the illustrated case, an air cylinder piston rod 24 is attached to a shaft portion 25 of the plunger 13, the piston rod/shaft portion assembly being sealed by a bellows 36 (to protect against entry of liquid). The plunger 13 is biased to the pinching position by a spring (not shown), so that the pinch valve will close (i.e. pinch the tube) in the absence of compressed air supply or electric power, the pinching position also being the normal state of this pinch valve embodiment.

Alternatively, a spring biases the plunger 13 to the retracted non-pinching position (being the normal state) and the plunger is driven pneumatically to the pinching position.

Similarly as in the embodiment shown in FIGS. 1a and 1b, a tube retaining means 19' in the form of a pivoting barrier is provided which can be manually operated to be placed in a tube locking position, as shown in FIGS. 2b and 3, or in a non-locking position, as shown in FIG. 2a. The pivoting barrier is here provided with opposed "wing" portions 19a' which aid in keeping down a tube inserted into the tube holding room 7 in a position to be effectively pinched by the plunger 13 (and which will also protect the operator's fingers during operation of the pinch valve). While in FIGS. 1a and 1b, the top surface 17a of the end piece 17 has two mutually orthogonal grooves 18a, 18b into which the barrier member 19 snaps in the non locking and locking positions, respectively, the now described embodiment has only a single groove 18a (extending in the longitudinal direction of the pinch valve) into which the barrier member 19' snaps in both the locking and non-locking positions.

The tube retaining means 19' is further operatively connected to a pivotal pinch protection device 26 which in the tube locking position of the tube retaining means does not affect movement of plunger 13, but in the non-locking position obstructs movement of the plunger into the tube holding room 7.

More specifically, the barrier member 19' is fixed to one end of a rod 27 (here by a pin 28 or the like) which is rotatably mounted in a vertical (with reference to the directions in the drawing) through-bore 29 in the body 5. The opposite end of rod 27 is attached to (or integral with) a horizontal plate member, here a disc 30. A spring 31 arranged in an annular recess 32 in a lower part of bore 29 surrounds rod 27 and acts upon the disc 30 to press the barrier member 19' towards the planar top surface 17a of the end piece 17 and into engagement with the groove 18a when pivoted in alignment therewith in the locking and non-locking positions, respectively.

The disc 30 forms the bottom of the plunger pathway in the tube holding room 7. As is best seen in FIG. 2a, the disc 30 has a recess 33 in a portion thereof, which is in registry with the plunger pathway when the tube retaining means is in the tube locking position. As shown in FIG. 3, the recess 33 is designed to receive the lower part of plunger 13 so that the plunger can reach the tube pinching position unhindered. The thickness or height of the rest of disc 30 is such that, when the tube retaining means 19' is in the non-locking position (or in any other position than the locking position), the disc 30 projects vertically into the plunger pathway sufficiently to effectively obstruct displacement of the plunger through the opening 15 into the tube holding room, as shown in FIG. 2a.

Therefore, with the tube retaining means 19' in the non-locking position, the operator can safely insert a tube into or remove it from the tube holding room 7 without risking to be pinched by the plunger, even in case of loss of compressed air supply or of electric power (when the spring 24 would otherwise force the plunger 13 into the tube pinching position). This is, of course, of particular advantage for systems where a plurality of pinch valves are used and/or a frequent exchange of tubes is necessary, such as in e.g. a bio-processing system comprising a flow path of pre-sterilized single-use tubing engaged with a plurality of pinch valves.

As can be seen from FIG. 3, the pinch valve embodiment therein is designed to be fixed to a instrument cabinet wall or the like extending through an opening therein via a gasket 34, here by a number of nut/screw assemblies 37, such an instrument, for example, being part of a bio-processing system.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A pinch valve adapted to hold at least one flexible tube in a tube holding room, said pinch valve comprising:
    a plunger adapted to protrude into said tube holding room and pinch said tube against an opposite side wall of said tube holding room, said plunger being controllable to be positioned in at least two different positions, wherein one position is an open position where the tube in the tube holding room is not pinched and one position is a pinching position where the tube is pinched between the plunger and said opposing wall; and
    a tube retaining means adapted to prevent the tube from escaping from the tube holding room especially when said plunger is in the open position and wherein said tube retaining means can be pivoted into at least two different positions, where one position is a non locking position used during insertion of a tube into the tube holding room and one position is a locking position for retaining a tube inside said tube holding room even when the plunger is in an open position; wherein the tube retaining means is rotatable around an axis which is substantially perpendicular to a longitudinal extension of a tube held in the tube holding room.

2. The pinch valve of claim 1, wherein the tube retaining means is configured to take three different positions, thereby allowing it to be operated from both sides of the pinch valve.

3. The pinch valve of claim 1, wherein the plunger covers almost the whole height of the tube holding room.

4. The pinch valve of claim 1, wherein the tube retaining means fits closely over the plunger when the tube retaining means is in locking position.

5. The pinch valve of claim 1, wherein the pinch valve further comprises a pinch protection means arranged to prevent the plunger from entering a pinching position when the tube retaining means is in the non-locking position.

6. The pinch valve of claim 5, wherein the pinch protection means comprises a pivotal blocking member operatively linked to the tube retaining means, so that in the non locking position of the tube retaining means the blocking member obstructs displacement of the plunger into the tube holding room but in the locking position permits displacement of the plunger to the pinching position.

7. The pinch valve of claim 6, wherein the blocking member comprises a rotatable disc member which forms a bottom portion of said tube holding room and which has a first portion having a first thickness and which when aligned with the tube holding room does not obstruct displacement of the plunger and a second portion having a second, greater thickness and which when aligned with the tube holding room projects into the tube holding room and obstructs displacement of the plunger.

8. A pinch valve adapted to hold at least one flexible tube in a tube holding room, said pinch valve comprising:
    a plunger adapted to protrude into said tube holding room and pinch said tube against an opposite side wall of said tube holding room, said plunger being controllable to be positioned in at least two different positions, wherein one position is an open position where the tube in the tube holding room is not pinched and one position is a pinching position where the tube is pinched between the plunger and said opposing wall; and
    a tube retaining means adapted to prevent the tube from escaping from the tube holding room especially when said plunger is in the open position and wherein said tube retaining means can be pivoted into at least two different positions, where one position is a non locking position used during insertion of a tube into the tube holding room and one position is a locking position for retaining a tube inside said tube holding room even when the plunger is in an open position, wherein the tube retaining means is configured to take three different positions, thereby allowing it to be operated from both sides of the pinch valve.

9. A pinch valve adapted to hold at least one flexible tube in a tube holding room, said pinch valve comprising:
    a plunger adapted to protrude into said tube holding room and pinch said tube against an opposite side wall of said tube holding room, said plunger being controllable to be positioned in at least two different positions, wherein one position is an open position where the tube in the tube holding room is not pinched and one position is a pinching position where the tube is pinched between the plunger and said opposing wall;
    a tube retaining means adapted to prevent the tube from escaping from the tube holding room especially when said plunger is in the open position and wherein said tube retaining means can be pivoted into at least two different positions, where one position is a non locking position used during insertion of a tube into the tube holding room and one position is a locking position for retaining a tube inside said tube holding room even when the plunger is in an open position; and
    a pinch protection means arranged to prevent the plunger from entering a pinching position when the tube retaining means is in the non-locking position.

10. The pinch valve of claim 9, wherein the pinch protection means comprises a pivotal blocking member operatively linked to the tube retaining means, so that in the non locking position of the tube retaining means the blocking member obstructs displacement of the plunger into the tube holding room but in the locking position permits displacement of the plunger to the pinching position.

11. The pinch valve of claim 10, wherein the blocking member comprises a rotatable disc member which forms a bottom portion of said tube holding room and which has a first portion having a first thickness and which when aligned with the tube holding room does not obstruct displacement of the plunger and a second portion having a second, greater thickness and which when aligned with the tube holding room projects into the tube holding room and obstructs displacement of the plunger.

* * * * *